(12) United States Patent
Sato et al.

(10) Patent No.: US 10,344,359 B2
(45) Date of Patent: Jul. 9, 2019

(54) ALUMINUM ALLOY CLAD SHEET AND ALUMINUM ALLOY CLAD STRUCTURAL MEMBER

(71) Applicant: Kabushiki Kaisha Kobe Seiko Sho (Kobe Steel, Ltd.), Kobe-shi (JP)

(72) Inventors: Kazufumi Sato, Kobe (JP); Katsushi Matsumoto, Kobe (JP)

(73) Assignee: Kobe Steel, Ltd., Kobe-shi (JP)

(*) Notice: Subject to any disclaimer, the term of this patent is extended or adjusted under 35 U.S.C. 154(b) by 304 days.

(21) Appl. No.: 15/341,569

(22) Filed: Nov. 2, 2016

(65) Prior Publication Data

US 2017/0145546 A1    May 25, 2017

(30) Foreign Application Priority Data

Nov. 20, 2015 (JP) ................. 2015-227582

(51) Int. Cl.
  *C22C 21/10*    (2006.01)
  *B32B 15/01*    (2006.01)
  *C22C 21/08*    (2006.01)

(52) U.S. Cl.
  CPC ............ *C22C 21/10* (2013.01); *B32B 15/016* (2013.01); *C22C 21/08* (2013.01)

(58) Field of Classification Search
  None
  See application file for complete search history.

(56) References Cited

U.S. PATENT DOCUMENTS

2018/0022067 A1    1/2018 Sato et al.

FOREIGN PATENT DOCUMENTS

| CN | 107250400 A | 10/2017 |
|---|---|---|
| JP | 2004-285391 | 10/2004 |
| JP | 5083862 | 11/2012 |
| JP | 2013-95980 | 5/2013 |
| JP | 2015-108163 | 6/2015 |

*Primary Examiner* — Daniel J. Schleis
(74) *Attorney, Agent, or Firm* — Oblon, McClelland, Maier & Neustadt, L.L.P.

(57) ABSTRACT

Provided is an aluminum alloy clad sheet that resolves the contradiction between a high strength level and ductility in a single sheet of the existing 7000-series aluminum alloy or the like, and has high strength, good formability (high ductility), and a good BH property through short-time artificial age hardening. An aluminum alloy clad sheet subjected to diffusion heat treatment includes a plurality of aluminum alloy layers being laminated. In the clad sheet, aluminum alloy layers having specific compositions are adjacently laminated such that the contents of Mg or Zn are different from each other, and a microstructure after the diffusion heat treatment has fine grain size and an interdiffusion region of Mg and Zn. In addition, the clad sheet has a specific DSC characteristic. Consequently, high strength and good formability (high ductility) are exhibited, and a BH property through short-time artificial age hardening is improved.

3 Claims, 2 Drawing Sheets

ALUMINUM ALLOY CLAD SHEET AND ALUMINUM ALLOY CLAD STRUCTURAL MEMBER

BACKGROUND

The present invention relates to an aluminum alloy clad sheet, and an aluminum alloy clad structural member produced by forming the material aluminum alloy clad sheet (hereinafter, aluminum may be referred to as Al). The clad sheet described herein refers to a laminate sheet produced by laminating aluminum alloy layers to one another, and bonding the aluminum alloy layers to one another by rolling or the like.

An aluminum alloy sheet is used as a material for a structural member of a transport machine such as a vehicle body and an airframe to achieve lightweight. In such a structural member, higher alloy content for higher strength tends to contradict formability into a structural member or certain ductility of the structural material.

For example, for 7000-series aluminum alloy or extra super duralumin (Al-5.5% Zn-2.5% Mg alloy) for the structural member, the amount of strength-increasing element such as Zn or Mg is increased as a typical method for increasing strength. This however reduces ductility and thus makes it difficult to form such alloy into a structural member. Furthermore, such high alloy causes deterioration of corrosion resistance or a reduction in strength due to room-temperature aging (age hardening) during storage. This significantly deteriorates formability into a structural member, or significantly reduces certain ductility of the structural material. In addition, this leads to low production efficiency of a sheet in a rolling step or the like.

Such a contradiction between high strength and formability (ductility) is extremely difficult to be resolved only by investigating a composition, a microstructure, or a manufacturing method of a simple aluminum alloy sheet (single sheet) such as the 7000-series aluminum alloy sheet and the extra super duralumin sheet.

As a measure to solve this problem, there has been known an aluminum alloy clad sheet (laminate sheet), in which two to four aluminum alloy layers (sheets) having different compositions or properties are laminated to one another.

A typical example of such an aluminum alloy clad sheet includes an aluminum-alloy brazing sheet for a heat exchanger, which has a three or four-layered structure in such a manner that a sacrificial anode material of 7000-series aluminum alloy and a 4000-series aluminum alloy brazing material are cladded on a 3000-series aluminum alloy core.

In addition, Japanese Unexamined Patent Application Publication No. 2004-285391 suggests an aluminum alloy material for a vehicle fuel tank, which includes a clad material including a core formed of a 5000-series aluminum alloy material for high strength, and a skin material formed of a 7000-series aluminum alloy material for high corrosion resistance.

Japanese Patent No. 5083862 suggests a method of manufacturing a clad sheet, in which differences in melting point between aluminum alloys such as 1000-series, 3000-series, 4000-series, 5000-series, 6000-series, and 7000-series are used to laminate at most four aluminum alloy layers in one by continuous casting with a twin roll.

Japanese Unexamined Patent Application Publication No. 2013-95980 suggests that when a plurality of aluminum alloy layers are laminated to one another, a Cu anti-corrosion layer is provided between such aluminum alloy layers, and Cu in the Cu anti-corrosion layer is diffused into the bonded aluminum alloy layers by high-temperature heat treatment to improve corrosion resistance of the clad sheet.

However, the contradiction between high strength and formability (ductility) must be resolved so that such existing aluminum alloy clad sheets have both the properties in order to use the aluminum alloy clad sheets for the structural members of the transport machines.

Hence, Japanese Unexamined Patent Application Publication No. 2015-108163 (JP-A-2015-108163) suggests a material aluminum alloy clad sheet having such two properties for structural members of vehicles, or an aluminum alloy clad structural member itself produced by forming (press-forming) the clad sheet as a material.

JP-A-2015-108163 aims to achieve both high strength and high press formability or ductility, which cannot be achieved by a single aluminum alloy sheet, by laminating aluminum alloy sheets having different compositions to one another, the aluminum alloy sheets including an Al—Mg alloy sheet, an Al—Zn alloy sheet, and an Al—Cu alloy sheet.

Figure 3:
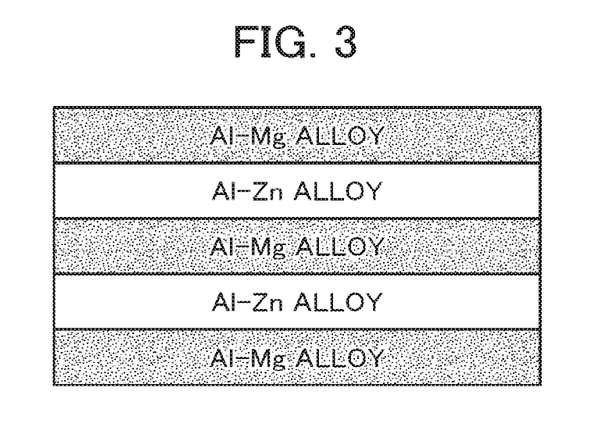
FIG. 3 is a section view illustrating an embodiment of the clad sheet of the invention.
Figure 4:
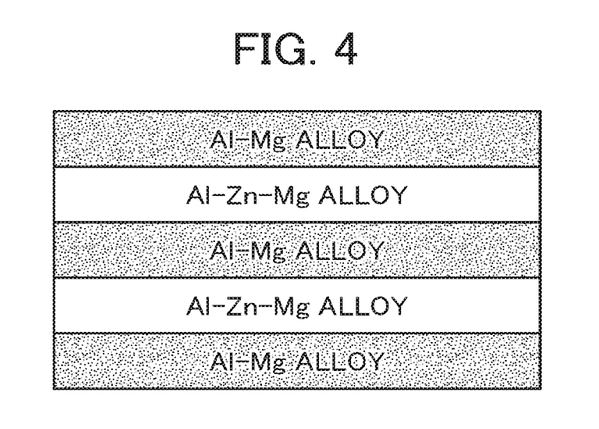
FIG. 4 is a section view illustrating another embodiment of the clad sheet of the invention.

Specifically, as illustrated in FIGS. 3 and 4 as described later, three to seven Al alloy layers, which have specific and different compositions (each containing one or both of Mg: 3 to 10 mass % and Zn: 5 to 30 mass %) such as an Al—Mg alloy layer and an Al—Zn alloy layer, are laminated to have a total thickness of 1 to 5 mm.

Such a laminate sheet is subjected to diffusion heat treatment so as to have an interdiffusion region in which Mg and Zn in the adjacently laminated aluminum alloy layers interdiffuse, and thus have a microstructure in which hardness of a bonding interface between the laminated aluminum alloy layers is higher than hardness of each of the laminated aluminum alloy layers configuring the bonding interface.

SUMMARY

JP-A-2015-108163 allows the aluminum alloy clad sheet for structural members of vehicles or the aluminum alloy clad structural member to have properties such as strength and press formability.

However, as with a single Al—Zn alloy sheet (7000-series alloy sheet), low-temperature and long-time artificial aging, for example, 120° C.×24 hr, is necessary to achieve high strength required for the structural members of vehicles.

In this regard, JP-A-2015-108163 naturally does not disclose a problem of a BH property (bake hardenability, artificial age hardenability) that allows high strength required for the structural members to be achieved through high-temperature and short-time artificial aging.

In other words, the aluminum alloy clad sheet or the aluminum alloy clad structural member of JP-A-2015-108163 has a problem that the required high strength cannot be given by high-temperature and short-time paint-bake hardening (artificial aging) of, for example, 160 to 205° C.×20 to 40 min performed after painting of a structural member of an existing vehicle or the like.

Unless such a problem is solved, the aluminum alloy clad sheet or the aluminum alloy clad structural member as in JP-A-2015-108163 is less likely to be used for the structural members of the vehicles due to complexity or inefficiency associated with necessity of modifying a step (condition) of the paint-bake hardening (artificial aging).

Hence, the aluminum alloy clad sheet for the aluminum alloy clad structural member is required to have high strength, good formability, and a good BH property through the high-temperature and short-time paint-bake hardening (artificial aging).

The aluminum alloy clad structural member is required to have high strength, high ductility, and a good BH property through the high-temperature and short-time paint-bake hardening (artificial aging).

To solve such a problem, an object of the invention is to provide an aluminum alloy clad sheet and an aluminum alloy clad structural member suitable for the structural members, each of the clad sheet and the clad structural member having high strength, good formability (high ductility), and a good BH property that secures a required high strength through high-temperature and short-time artificial aging used for structural members of vehicles.

To achieve the object, an aluminum alloy clad sheet having high strength, good formability, and a good BH property is summarized by an aluminum alloy clad sheet including a plurality of aluminum alloy layers, in which each of the aluminum alloy layers inner than an aluminum alloy layer on an outermost layer side of the aluminum alloy clad sheet contains one or both of Mg: 3 to 10 mass % and Zn: 5 to 30 mass %, the aluminum alloy layer on the outermost layer side has a composition containing Mg in a range from 3 to 10 mass % and Zn that is limited to 2 mass % or less (including 0 mass %), the aluminum alloy layers are laminated such that aluminum alloy layers having different contents of one of Mg and Zn are adjacent to each other, the total number of laminated layers is 5 to 15, and the total thickness is 1 to 5 mm, the aluminum alloy clad sheet has an average content of each of Mg and Zn in a range of Mg: 2 to 8 mass % and in a range of Zn: 3 to 20 mass %, the average content corresponding to a value obtained by averaging the contents of each of Mg and Zn of the laminated aluminum alloy layers, a microstructure of the aluminum alloy clad sheet has an average grain size of 200 µm or less, the average grain size being obtained by averaging grain sizes of the laminated aluminum alloy layers, and has an interdiffusion region of Mg and Zn, the interdiffusion region containing Mg and Zn interdiffusing from the laminated aluminum alloy layers, and in a differential scanning calorimetry curve of the aluminum alloy clad sheet, an exothermic peak appearing on a lowest temperature side is at a temperature of 180° C. or lower, and a height of the exothermic peak is 15 µW/mg or more.

To achieve the object, an aluminum alloy clad structural member having high strength, high ductility, and a good BH property is summarized by an aluminum alloy clad structural member including a plurality of aluminum alloy layers, in which each of the aluminum alloy layers inner than an aluminum alloy layer on an outermost layer side of the aluminum alloy clad structural member contains one or both of Mg: 3 to 10 mass % and Zn: 5 to 30 mass %, the aluminum alloy layer on the outermost layer side has a composition containing Mg in a range from 3 to 10 mass % and Zn that is limited to 2 mass % or less (including 0 mass %), the aluminum alloy layers are laminated such that aluminum alloy layers having different contents of one of Mg and Zn are adjacent to each other, the total number of laminated layers is 5 to 15, and the total thickness is 1 to 5 mm, the aluminum alloy clad structural member has an average content of each of Mg and Zn in a range of Mg: 2 to 8 mass % and in a range of Zn: 3 to 20 mass %, the average content corresponding to a value obtained by averaging the contents of each of Mg and Zn of the laminated aluminum alloy layers, a microstructure of the aluminum alloy clad structural member has an average grain size of 200 µm or less, the average grain size being obtained by averaging grain sizes of the laminated aluminum alloy layers, and has an interdiffusion region of Mg and Zn, the interdiffusion region containing Mg and Zn interdiffusing from the laminated aluminum alloy layers, and in a differential scanning calorimetry curve of the aluminum alloy clad structural member, an exothermic peak appearing on a lowest temperature side is at a temperature of 180° C. or lower, and a height of the exothermic peak is 15 µW/mg or more.

The aluminum alloy clad sheet described in the invention refers to an aluminum alloy clad sheet as a material for a structural member, which includes aluminum alloy layers that are laminated to one another and bonded in one by rolling or the like, and is subjected to tempering in a manner of diffusion heat treatment as described later (hereinafter, aluminum may be referred to as Al).

The aluminum alloy clad structural member described in the invention refers to a structural member, which is produced in such a manner that the aluminum alloy clad sheet subjected to diffusion heat treatment is used as a material, and the material aluminum alloy clad sheet (material laminate sheet) is formed into a product shape of the structural member by press forming or the like, the structural member being still not subjected to artificial age hardening (paint-bake hardening).

When the aluminum alloy clad sheet being not subjected to diffusion heat treatment is used as a material, the aluminum alloy clad structural member refers to a structural member that is produced by forming the material aluminum alloy clad sheet (material laminate sheet) into a product shape of the structural member by press forming or the like, and is then subjected to the diffusion heat treatment before being subjected to artificial age hardening (paint-bake hardening).

In the invention, it is assumed that the aluminum alloy clad sheet or the aluminum alloy clad structural member has the above-described number of layers and thickness, and has the aluminum alloy layers cladded to one another, each aluminum alloy layer containing Mg and Zn, in particular a large amount of Zn, in order to achieve high strength, good formability (or high ductility), and a good BH property.

In addition, diffusion heat treatment is performed in a stage of the material aluminum alloy clad sheet or after the aluminum alloy clad sheet is press-formed into the aluminum alloy clad structural member (product shape) to produce the aluminum alloy clad structural member having an interdiffusion region of Mg and Zn, in which Mg and Zn interdiffuse from the laminated aluminum alloy layers.

Through such element diffusion, a new composite precipitate including Mg and Zn is precipitated at a bonding interface between the aluminum alloy layers.

In addition, in the invention, the composite precipitate at a nanometer (nm: 1/1000 µm) level caused by the element diffusion is dispersed as a specific microstructure of the aluminum alloy clad sheet or the aluminum alloy clad structural member after the diffusion heat treatment and before the artificial age hardening (T6 treatment) in order to secure the high strength (BH property) necessary for the structural member of the transport machine even by the short-time artificial aging.

However, such a fine precipitate is difficult to be directly measured by common TEM or the like for the aluminum alloy clad sheet or the aluminum alloy clad structural member, in which element concentration distribution varies due to the element diffusion.

In the invention, therefore, the microstructure having the fine precipitate is assumed as the microstructure of the aluminum alloy clad sheet or the aluminum alloy clad structural member after the diffusion heat treatment and before the artificial age hardening (T6 treatment), and is indirectly determined by an exothermic peak in a specific temperature range in a differential scanning calorimetry curve of the aluminum alloy clad sheet or the aluminum alloy clad structural member.

Consequently, the invention allows the aluminum alloy clad sheet or the aluminum alloy clad structural member to have high ductility and a BH property that secures high strength through short-time artificial aging.

Specifically, the sheet or the structural member can have a BH property that secures a 0.2% proof stress of 400 MPa or more after being subjected to short-time artificial age hardening of 180° C.×30 min following the diffusion heat treatment.

DETAILED DESCRIPTION

A best mode for carrying out the aluminum alloy clad sheet (hereinafter, may be simply referred to as clad sheet) of the invention and the aluminum alloy clad structural member (hereinafter, may be simply referred to as clad structural member), which is formed using the clad sheet as a material, of the invention is now described with FIGS. 3 and 4. FIGS. 3 and 4 each merely show a section of part of the clad sheet of the invention in a width or rolling (longitudinal) direction. Such a sectional structure extends evenly (uniformly) in the width or rolling direction over the entire clad sheet of the invention.

In the following description of one embodiment of the invention, a sheet that has not been cladded is referred to as aluminum alloy sheet, and when the aluminum alloy sheet is cladded and thinned by rolling, a layer of such a clad sheet is referred to as aluminum alloy layer.

Hence, the meaning of definition of a composition or a lamination way of the aluminum alloy layer of the clad sheet may be considered as the same meaning of definition of that of an aluminum alloy sheet or a slab before being cladded.

Lamination Way of Clad Sheet

In the clad sheet of the invention, 5 to 15 aluminum alloy layers, each containing one or both of Mg and Zn in a defined range, are laminated (cladded) to one another, in which aluminum alloy layers having different contents of one of Mg and Zn are adjacent to each other. The aluminum alloy clad sheet is relatively thin, i.e., the total thickness of the laminated clad sheets is in a range from 1 to 5 mm.

In the clad sheet of the invention, a lamination way must be varied depending on compositions of the aluminum alloy layers to be combined for lamination. Such a lamination way is described with FIGS. 3 and 4.

FIG. 3 shows an example where an Al—Mg alloy sheet (aluminum alloy layer such as A in Table 1 as described later) is disposed as each of the aluminum alloy layers (two outermost layers) on the outermost layer side, an Al—Zn alloy sheet (aluminum alloy layer such as D or E in Table 1) is laminated on a side inner than each outermost layer, and an Al—Mg alloy sheet (aluminum alloy layer such as A in Table 1) is disposed in the middle, i.e., five layers in total are laminated.

Also, FIG. 4 shows an example where an Al—Mg alloy sheet (aluminum alloy layer such as A in Table 1) is disposed as each of the aluminum alloy layers (two outermost layers) on the outermost layer side, an Al—Zn—Mg alloy sheet is laminated on a side inner than each outermost layer, and an Al—Mg alloy sheet (aluminum alloy layer such as A in Table 1) is disposed in the middle, i.e., five layers in total are laminated.

FIGS. 3 and 4 each show the example of the invention, in which aluminum alloy sheets, which are to be laminated to one another, are aluminum alloy layers that each contain one or both of Mg and Zn in the defined range but have different contents of at least one of Mg and Zn.

Among such aluminum alloy layers to be combined, the Al—Zn aluminum alloy layer in FIG. 3 and the Al—Zn—Mg aluminum alloy layer in FIG. 4, each containing Zn in the defined content range, are bad in corrosion resistance, and are each laminated on an inner side of the clad sheet to secure corrosion resistance of the clad sheet.

If each of such aluminum alloy layers containing Zn is laminated on an outer side (surface side) of the clad sheet, the clad sheet and in turn the clad structural member are deteriorated in corrosion resistance because of the high Zn content.

Hence, in FIGS. 3 and 4, the clad sheet containing Mg in the above-described content range (from 3 to 10 mass %) such as the Al—Mg alloy sheet is laminated as the aluminum alloy layer on each of the outermost layer sides (both surface sides) of the clad sheet. However, if such an Al—Mg alloy contains a large amount of Zn or Cu in addition to Mg, corrosion resistance is also deteriorated. Hence, it is necessary to provide an aluminum alloy layer in which the Zn content is limited to 2 mass % or less (including 0%) so that corrosion resistance is not significantly deteriorated.

As the number of layers to be laminated (number of slabs as described later or sheets, or number of laminated layers) is larger, the properties of the clad sheet are more effectively exhibited, and at least five layers (sheets) are necessary to be laminated. For four layers or less, even if a lamination way is devised, a relatively thin aluminum alloy clad sheet having a thickness of 1 to 5 mm is not significantly different in properties from a simple sheet (single sheet), and thus there is no meaning in lamination. On the other hand, when more than 15 layers (15 sheets) are laminated, the properties of the clad sheet are promisingly more improved. This however is inefficient and impractical in consideration of productivity in an actual manufacturing process. Hence, about 15 layers is the upper limit.

Manufacturing Method of Clad Sheet

A manufacturing method of the clad sheet before being subjected to diffusion heat treatment is described.

In a typical simple sheet (single sheet), if the 7000-series aluminum alloy or the like is formed into high alloy in a manner of increasing Mg to 10 mass % or increasing Zn to 30 mass % as in the invention, ductility is extremely reduced and a rolling crack occur, and thus rolling is difficult. In contrast, in the invention, since a laminate sheet (laminate slab) includes thin sheets that have different compositions, even if the laminate sheet is formed into high alloy, ductility is high. Hence, the laminate sheet can be formed into a thin clad by rolling including cold rolling. That is, the clad sheet of the invention before being subjected to diffusion heat treatment is advantageous in that it can be manufactured as a rolled clad sheet by a typical rolling step.

Hence, 5 to 15 aluminum alloy slabs or sheets, which each contain one or both of Mg and Zn in a defined range and have different contents of one of Mg and Zn, are laminated (cladded) before being formed into a clad sheet by rolling. As with a typical rolling step, such a laminate may be subjected to homogenization as necessary before being hot-rolled into a clad sheet.

To further reduce a thickness in the above-described thickness range, such a clad sheet is further cold-rolled while being subjected to process annealing as necessary. Such a rolled clad sheet is subjected to tempering (heat treatment such as anneal or solution treatment) to manufacture the clad sheet of the invention.

In a possible process, the aluminum alloy slabs are separately subjected to homogenization, and then the slabs are laminated to one another and reheated to a hot-rolling temperature before hot rolling. In another possible process, the aluminum alloy slabs are separately subjected to homogenization and then separately hot-rolled, and are separately subjected to process annealing or cold rolling as necessary so as to be separately formed into sheets each having an appropriate thickness, and then the sheets are laminated to one another, and such sheet materials are further cold-rolled into a clad sheet.

The reason why the total thickness of the clad sheet of the invention is within a relatively small range from 1 to 5 mm is because the range corresponds to a thickness range generally used in the structural member of the transport machine. If the thickness is less than 1 mm, the clad sheet does not meet the required properties such as stiffness, strength, workability, and weldability necessary for the structural member. If the thickness exceeds 5 mm, the clad sheet is difficult to be press-formed into the structural member of the transport machine. In addition, lightweight necessary for the structural member of the transport machine is not achieved clue to weight increase.

To make the total thickness of the final clad sheet to be 1 to 5 mm by the rolling clad method, the thickness (sheet thickness) of the slab is about 50 to 200 mm depending on the number of sheets (layers) to be laminated or on reductions. When the total thickness of the final clad sheet is 1 to 5 mm, thickness of each of the laminated alloy layers is about 0.05 to 2.0 mm (50 to 2000 μm) depending on the number of sheets (layers) to be laminated.

For a process where the individual sheets are singly subjected to homogenization, hot rolling, and cold rolling as necessary, and then are laminated into a clad sheet by a cold rolling step, thickness of each sheet material being laminated is about 0.5 to 5.0 mm depending on the number of sheets (layers) to be laminated or on reductions.

Aluminum Alloy

The composition of each of the laminated aluminum alloy layers of the clad sheet before being subjected to diffusion heat treatment (before being formed into the structural member) contains one or both of Mg: 3 to 10 mass % and Zn: 5 to 30 mass %. In other words, the aluminum alloy sheet or slab before being cladded (laminated) or the cladded aluminum alloy layer has a composition containing one or both of Mg: 3 to 10 mass % and Zn: 5 to 30 mass %.

The average content of each of Mg and Zn of the entire aluminum alloy clad sheet before being subjected to diffusion heat treatment (before being formed into the structural member) is in a range of Mg: 2 to 8 mass % and in a range of Zn: 3 to 20 mass %, the average content corresponding to a value obtained by averaging the contents of each of Mg and Zn of the laminated aluminum alloy layers.

To secure formability and strength, it is necessary that aluminum alloy layers (sheets), which have the above-described composition and have different contents of at least one of Mg and Zn, are laminated to each other, and the entire aluminum alloy clad sheet contains each of Mg and Zn in the above-described content range.

Composition of Aluminum Alloy Layer

Such an aluminum alloy layer containing one or both of Mg: 3 to 10 mass % and Zn: 5 to 30 mass % may be a binary aluminum alloy such as an Al—Zn system and an Al—Mg system. A ternary system such as an Al—Zn—Mg system, an Al—Zn—Cu system, and an Al—Mg—Cu system, a quaternary system such as an Al—Zn—Cu—Zr system, or a quantic system such as an Al—Zn—Mg—Cu—Zr system may be used. In each of such systems, at least one of selective additional elements Zn, Mg, Cu, Zr, and Ag is added to the binary aluminum alloy.

A predetermined number of such aluminum alloy layers are combined and laminated to one another such that aluminum alloy layers having different contents of one of Mg and Zn are adjacently bonded, and the entire clad sheet contains Mg, Zn, and at least one of the selective additional elements Cu, Zr, and Ag as necessary in the respective average content ranges.

The meaning of containing or limiting each element as a component of the aluminum alloy layer to be cladded or the clad sheet is now described. For the component of the clad sheet, the content of each element is referred to as an average of the contents of each element of the sheets (all the sheets) to be laminated rather than the contents of each element of the aluminum alloy layers. In the following, the percentage representing the content refers to mass percent.

Mg: 3 to 10%

Mg is an indispensable alloy element, and forms, with Zn, a cluster (fine precipitate) in a microstructure of the clad sheet or the clad structural member, and thus improves work hardenability (formability or ductility). In addition, Mg forms an age precipitate in a microstructure or a bonding interface of the clad sheet or the clad structural member. The Mg content of less than 3% results in insufficient strength. If the Mg content exceeds 10%, a casting crack occurs, and ductility of the clad sheet (slab) is reduced, leading to difficult manufacturing of the clad sheet.

Zn: 5 to 30%

Zn is an indispensable alloy element, and forms, with Mg, a cluster (fine precipitate) in a microstructure of the clad sheet or the clad structural member, and thus improves work hardenability (formability or ductility). In addition, Zn forms an age precipitate in a microstructure or a bonding interface of the clad sheet or the clad structural member. The Zn content of less than 5% results in insufficient strength and a reduction in balance between strength and formability.

If the Zn content exceeds 30%, a casting crack occurs, and ductility of the clad sheet (slab) is reduced, leading to difficult manufacturing of the clad sheet. Even if the clad sheet can be manufactured, the amount of an intergranular precipitate $MgZn_2$ increases and thus intergranular corrosion easily occurs, leading to extreme deterioration of corrosion resistance and deterioration of formability.

One or More of Cu, Zr, and Ag

Cu, Zr, and Ag are equieffective elements that each increase strength of the clad sheet or the clad structural member while having differences in action mechanism therebetween, and are each contained as necessary.

Cu exhibits the effect of increasing strength. In addition, a small content of Cu exhibits an effect of improving corrosion resistance. A small content of Zr exhibits an effect of increasing strength through refining grains of the slab and the clad sheet. A small content of Ag exhibits an effect of increasing strength through refining an age precipitate produced in a microstructure or a bonding interface of the clad sheet or the clad structural member. However, if the content of each of Cu, Zr, and Ag is excessively large, manufacturing of the clad sheet is difficult. Even if the clad sheet can be manufactured, various problems occur, such as deterioration of corrosion resistance including stress corrosion cracking (SCC) resistance, and a reduction in ductility or deterioration of a strength characteristic. Hence, when such elements are selectively contained, the contents are defined as follows: Cu: 0.5 to 5 mass %, Zr: 0.3 mass % or less (not including 0%), and Ag: 0.8 mass % or less (not including 0%).

Other Elements:

Elements other than the described elements are inevitable impurities. Such impurity elements are assumed (allowed) to be contaminated due to use of aluminum alloy scraps as a melting material in addition to pure aluminum metal, and are allowed to be contained. Specifically, if the contents of the impurity elements are as follows: Fe: 0.5% or less, Si: 0.5% or less, Li: 0.1% or less, Mn: 0.5% or less, Cr: 0.3% or less, Sn: 0.1% or less, and Ti: 0.1% or less, ductility and a strength characteristic of the clad sheet of the invention are not deteriorated, and the impurity elements are allowed to be contained.

Composition of Entire Clad Sheet

The invention defines the composition of the aluminum alloy layer, and further defines the average content of each of Mg and Zn as an average composition of the entire clad sheet before the diffusion heat treatment.

The average content of each of Mg and Zn of the entire clad sheet is obtained in terms of a weighted arithmetic mean determined through assigning a weight corresponding to a clad ratio to the content of each of Mg and Zn of each of the laminated aluminum alloy layers. The average content of each of Mg and Zn of the entire clad sheet, which is obtained as the weighted arithmetic mean, is defined to be contained in a range of Mg: 2 to 8 mass % and in a range of Zn: 3 to 20 mass %.

Specifically, the average composition of the entire clad sheet is defined to contain one or both of Mg and Zn in the defined average content range, and selectively contain one or more of Cu, Zr, and Ag, the remainder consisting of aluminum and inevitable impurities.

The average content of each of Mg and Zn of the entire clad sheet is determined as a weighted arithmetic mean obtained through assigning a weight corresponding to a clad ratio of each aluminum alloy layer of the clad sheet to the content of each of Mg and Zn of aluminum alloy configuring that aluminum alloy layer. With the clad ratio, for example, when all aluminum alloy layers have the same thickness in a five-layered aluminum alloy clad sheet, each aluminum alloy layer has a clad ratio of 20%. The weighted arithmetic mean of the content of each of Mg and Zn is calculated using the clad ratio, and determined as the average content of each of Mg and Zn of the entire clad sheet.

When the average content of each of Mg and Zn as the average composition of the entire clad sheet is excessively small, i.e., less than the lower limit, interdiffusion of Mg or Zn into the microstructures of the sheets laminated to each other becomes insufficient, each microstructure being given after the clad sheet is subjected to diffusion heat treatment of 500° C.×4 hr.

As a result, such insufficient diffusion causes insufficient precipitated amount of a new composite precipitate (age precipitate) including Mg and Zn into the bonding interface between the sheets. Hence, the total thickness in the thickness direction of the interdiffusion region of Mg and Zn becomes too small, and thus the aluminum alloy clad sheet cannot be increased in strength. Specifically, the aluminum alloy clad structural member, which is produced through diffusion heat treatment or artificial aging of the aluminum alloy clad sheet, cannot have a certain strength, i.e., 0.2% proof stress of 400 MPa or more.

When the average content of each of Mg and Zn as the average composition of the entire clad sheet is excessively large, i.e., more than the upper limit, ductility of the clad sheet is extremely reduced. Hence, press formability is reduced to a level equivalent to a level of the 7000-series aluminum alloy sheet, the extra super duralumin sheet, a 2000-series aluminum alloy sheet, or an 8000-series aluminum alloy sheet for the structural member, and thus there is no meaning in the clad sheet.

The invention intends to be an alternative to the aluminum alloy sheet for the structural member, including 7000-series, extra super duralumin (Al-5.5% Zn-2.5% Mg alloy), 2000-series, and 8000-series. Specifically, the invention chiefly aims at greatly improving ductility of such a high-strength material in a stage of the clad sheet as a forming material, and increasing strength to a level similar to that of the existing high-strength material including a single sheet through diffusion heat treatment or artificial aging after forming the clad sheet into the structural member. Hence, a final composition of the clad sheet, which is a composition of the entire clad sheet, must be equal or similar to a composition of the 7000-series aluminum alloy sheet, the extra super duralumin sheet, the 2000-series aluminum alloy sheet, or the 8000-series aluminum alloy sheet for the structural member.

From such a viewpoint, therefore, it is of significance that the composition of the clad sheet of the invention is made similar to that of a single sheet of the existing aluminum alloy sheet for the structural member, including 7000-series, extra super duralumin (Al-5.5% Zn-2.5% Mg alloy), 2000-series, or 8000-series. Specifically, it is of significance that the clad sheet contains one or both of Mg and Zn, which are major elements of such existing aluminum alloy sheets, in a range of Mg: 3 to 10 mass % and in a range of Zn: 5 to 30 mass %.

In this regard, the clad sheet or the aluminum alloy layer of the invention may contain Si and/or Li that are selectively contained in the composition of the existing aluminum alloy sheets.

Element Structure of Clad Sheet

The invention defines the alloy composition itself and the alloy composition combination as described above, and defines a microstructure of the aluminum alloy clad sheet and a microstructure of the aluminum alloy clad structural member produced by forming the aluminum alloy clad sheet after the diffusion heat treatment and before the artificial age hardening (TG treatment).

Mg and Zn contained in the respective cladded aluminum alloy layers interdiffuse into the laminated (bonded) aluminum alloy layers through diffusion heat treatment. Through such interdiffusion of elements, a new Zn—Mg fine composite precipitate (age precipitate) including Mg and Zn is densely precipitated into a bonding interface between the aluminum alloy layers to perform interfacial structure control (ultrahigh-density dispersion of nano-level fine precipitates). Consequently, the clad sheet (structural member) can be increased in strength after being subjected to diffusion heat treatment, preferably further being subjected to artificial aging.

Hence, the element-interdiffusion microstructure of the aluminum alloy clad sheet of the invention is a microstructure of the aluminum alloy clad sheet subjected to the predetermined diffusion heat treatment as defined in claims of this application together with the average grain size of the aluminum alloy layer. Actually, the element-interdiffusion microstructure is a microstructure of the structural member produced by forming the aluminum alloy clad sheet and subjected to diffusion heat treatment (before artificial age hardening).

To further determine the microstructure as a microstructure of the material aluminum alloy clad sheet, the invention defines the microstructure as an interdiffusion microstructure of elements (interdiffusion region of Mg and Zn) or average grain size when the aluminum alloy clad sheet is subjected to diffusion heat treatment before being subjected to artificial age hardening.

Specifically, the invention defines the interdiffusion region of Mg and Zn and the average grain size when the aluminum alloy clad sheet is subjected to diffusion heat treatment as an experiment in a sense before being subjected to artificial age hardening as in Example as described later, so that the microstructure of the structural member can be determined and evaluated in a stage of the material aluminum alloy clad sheet even if diffusion heat treatment is not performed after the clad sheet is formed into the structural member.

To allow Mg and Zn contained in each aluminium alloy layer to interdiffuse between the adjacent laminated aluminium alloy layers, it is necessary, as a prerequisite, that the aluminium alloy layers to be laminated to one another contain one or both of Mg and Zn in a defined range, and have different contents of at least one of Mg and Zn.

Specifically, if the aluminium alloy layers have the same contents of each of Mg and Zn, interdiffusion of each of Mg and Zn between the bonded layers does not occur even if the layers have different contents of each of other elements; hence, the new fine composite precipitate (age precipitate) including Mg and Zn cannot be densely precipitated in a bonding interface between the bonded layers, so that high strength is not achieved.

The aluminium alloy layers to be cladded are each defined to have the specific composition containing large amount of each of Mg and Zn, and the aluminium alloy layers to be laminated and bonded to each other are defined to have different contents of at least one of Mg and Zn. Such definitions are made not only from the viewpoint of ductility, but also to increase strength by precipitating the composite precipitate caused by diffusion of the elements in the bonding interface between the layers through diffusion heat treatment.

In the invention, to secure high strength through exhibition of such a mechanism, a microstructure and concentration distribution in a thickness direction of Mg and Zn of the aluminum alloy clad sheet (or the structural member) subjected to diffusion heat treatment are defined such that the average grain size of each of the laminated aluminum alloy layers is 200 μm or less as described later, and the interdiffusion region of Mg and Zn, in which Mg and Zn interdiffuse from the laminated aluminum alloy layers, is provided.

Average Grain Size

For the aluminum alloy clad sheet or the aluminum alloy clad structural member after the diffusion heat treatment and before the artificial age hardening (T6 treatment), an average grain size obtained by averaging grain sizes in thickness center portions (0.05 mm from the thickness center in either thickness direction (thickness of 0.1 mm) in a plane parallel to rolling of the clad sheet) of the laminated aluminum alloy layers is 200 μm or less. In other words, the crystal grains are prevented from being coarsened by diffusion heat treatment.

This means that if the average grain size obtained by averaging all grain sizes in (the thickness center portions of) the laminated aluminum alloy layers exceeds 200 μm, most of the grains in the laminated aluminum alloy layers are coarsened so that each grain size exceeds 200 μm.

Hence, when the clad sheet including the laminated aluminum alloy layers or the aluminum alloy clad structural member after the diffusion heat treatment is subjected to short-time artificial age hardening of, for example, 180° C.×30 min, the clad sheet or the clad structural member cannot have the BH property securing the 0.2% proof stress of 400 MPa or more.

When the clad sheet of the invention or each of the aluminum alloy layers to be combined for lamination has a large thickness, the average grain size for each aluminum alloy layer less contributes to strength and formability. In the invention, however, 5 to 15 aluminum alloy layers are laminated (cladded) to one another, and the laminated clad sheet is thin, i.e., has a total thickness of 1 to 5 mm; hence, the average grain size for each aluminum alloy layer significantly contributes to strength and formability.

Differential Scanning Calorimetry Curve

In the invention, the aluminum alloy clad structural member, which is increased in strength through interdiffusion of the elements by diffusion heat treatment, is improved in BH property when the structural member is further subjected to short-time artificial aging or paint baking. In the invention, therefore, it is assumed that the aluminum alloy clad structural member is subjected to short-time artificial aging or paint-bake hardening.

The invention is based on a metallurgical design idea to secure high strength (BH property) caused by bake hardening through such short-time artificial aging or paint-bake hardening, in which a fine composite precipitate at a nanometer (nm: 1/1000 μm) level produced by the element diffusion is dispersed as a microstructure of the aluminum alloy clad sheet or the aluminum alloy clad structural member after the diffusion heat treatment and before the artificial age hardening (T6 treatment).

However, a distribution state of such a fine composite precipitate varies depending on measurement sites in the aluminum alloy clad sheet or the aluminum alloy clad structural member, in which concentration distribution of each element varies in a thickness direction, and thus the fine composite precipitate is extremely difficult to be directly measured by common TEM or the like. Even if the fine composite precipitate is measured, whether or not such a measurement value represents the aluminum alloy clad sheet or the aluminum alloy clad structural member, or whether the measurement value correlates with high strength given by a BH property is not clear.

Hence, the invention indirectly defines the microstructure having the fine precipitate by a temperature range having a distinct exothermic peak appearing on a differential scanning calorimetry curve (hereinafter, may be referred to as DSC) of the aluminum alloy clad sheet or the aluminum alloy clad structural member after the diffusion heat treatment and before the artificial age hardening (T6 treatment).

Consequently, the invention allows the aluminum alloy clad sheet or the aluminum alloy clad structural member to have a BH property securing a 0.2% proof stress of 400 MPa or more after being subjected to short-time artificial age hardening of, for example, 180° C.×30 min following the diffusion heat treatment.

To improve the BH property of the aluminum alloy clad structural member, the invention defines that the exothermic peak appearing on the lowest temperature side is at a temperature of 180° C. or lower, and a height of the exothermic peak is 15 µW/mg or more in the differential scanning calorimetry curve (DSC) of the aluminum alloy clad structural member after being subjected to the diffusion heat treatment.

Figure 1:
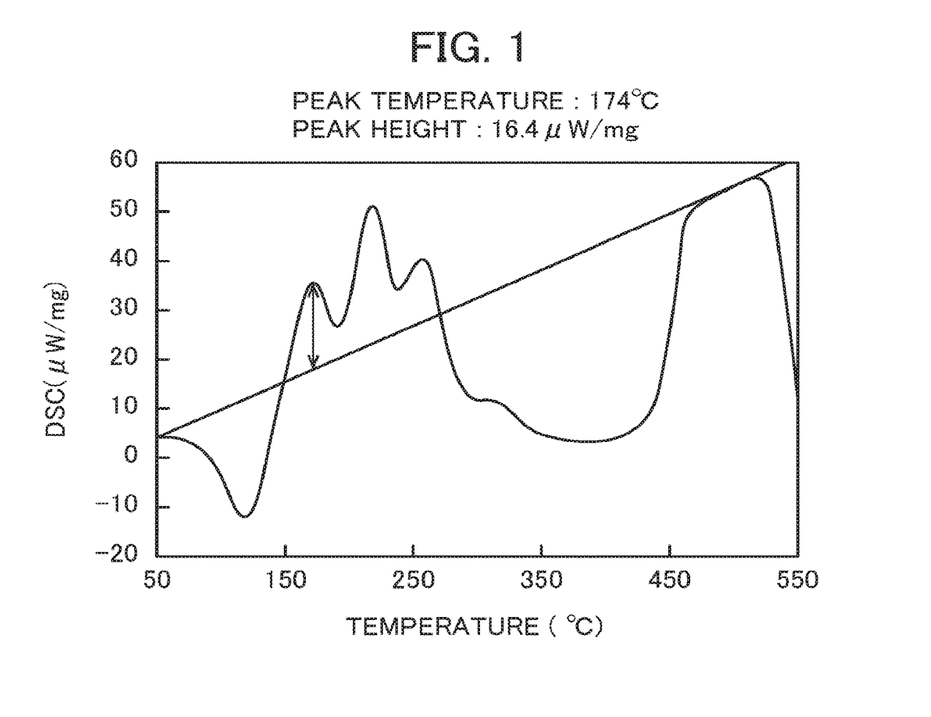
FIG. 1 is an explanatory diagram illustrating DSC of a clad sheet of the invention.
Figure 2:
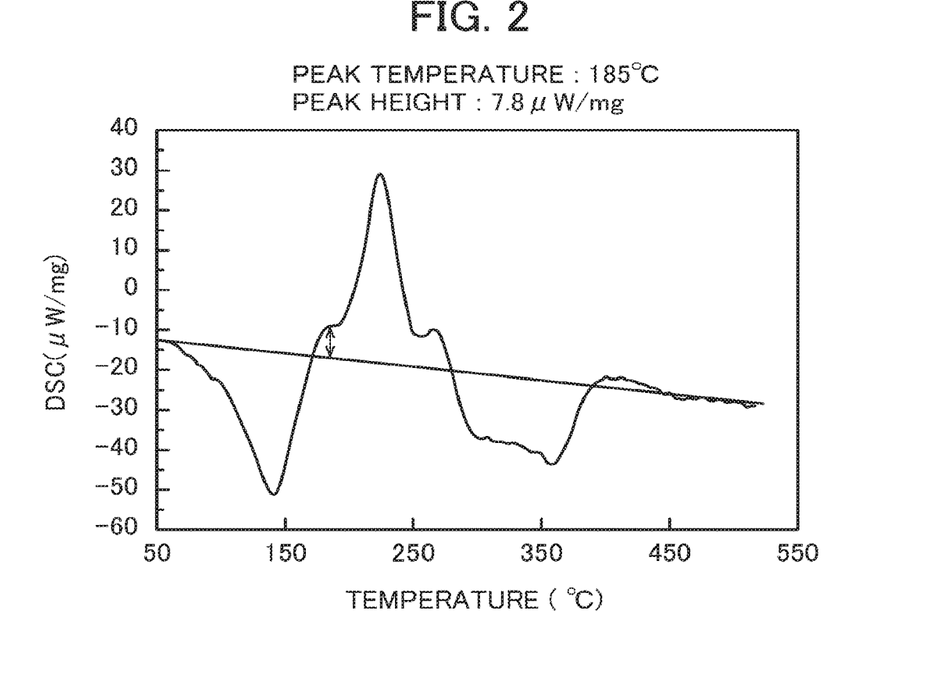
FIG. 2 is an explanatory diagram illustrating DSC of a clad sheet of a comparative example.

FIG. 1 illustrates DSC of inventive example 1 in Example as described later as a specific example of DSC satisfying such a condition. FIG. 2 illustrates DSC of comparative example 9 in the Example as a specific example of DSC that does not satisfy the condition.

Furthermore, the invention secures that the BH property of the clad structural member is also exhibited by the material aluminum alloy clad sheet before being formed into the clad structural member. Hence, it is also defined that the exothermic peak appearing on the lowest temperature side is at a temperature of 180° C. or lower, and a height of the exothermic peak is 15 µW/mg or more in the differential scanning calorimetry curve (DSC) of the aluminum alloy clad sheet that is subjected to heat treatment simulating the diffusion heat treatment for the clad structural member.

In other words, it is defined that the exothermic peak appearing on the lowest temperature side is at a temperature of 180° C. or lower and a height of the exothermic peak is 15 µW/mg or more in the DSC after the diffusion heat treatment at one point of holding at 500° C. for 4 hr followed by cooling to room temperature at a cooling rate of 80° C./sec.

To reproducibly perform such evaluation in the material stage, the material aluminum alloy clad sheet must be subjected to the diffusion heat treatment under a condition at one point of holding at 500° C. for 4 hr followed by cooling to room temperature at a cooling rate of 80° C./sec.

If conditions of the diffusion heat treatment are not narrowed to one in this way, reproducibility is not given because particularly a temperature position corresponding to the exothermic peak in a resultant differential scanning calorimetry curve greatly varies depending on conditions of the diffusion heat treatment.

As described above, through control of exothermic peak temperature in DSC, the material aluminum alloy clad sheet or the clad structural member having a good short-time BH property can be produced, and can have the BH property securing a 0.2% proof stress of 400 MPa after being subjected to artificial age hardening of 180° C.×30 min or paint baking following the diffusion heat treatment, for example.

This is estimated to be because the peak temperature of the exothermic peak is controlled to be within a temperature range of 180° C. or lower, thereby a precipitate (metastable phase) existing after the diffusion heat treatment is melted during artificial aging or paint baking, and then a new precipitate (stable phase) is precipitated, resulting in high strength.

On the other hand, it is estimated that as shown in FIG. 2 in the Example described later (comparative example 9 in Table 2), when the exothermic peak on the lowest temperature side appears at more than 180° C. in DSC, or when a height of such a exothermic peak is less than 15 µW/mg even if the exothermic peak appears at 180° C. or lower in DSC, the precipitate (metastable phase) existing after the diffusion heat treatment is not melted during the short-time artificial aging or paint baking, and the precipitate is directly coarsened, thereby the BH property is deteriorated.

A tendency of such a decrease in strength due to coarsening of a precipitate may be found when a single sheet of typical 7000-series aluminum alloy is subjected to artificial aging. This reveals that the effect of improving the BH property through control of the peak temperature in DSC of the invention is unique to the aluminum alloy clad sheet or the clad structural member of the invention, and is not found in the single sheet of the existing 7000-series aluminum alloy.

It is further estimated to be a cause of deterioration of the BH property that if the exothermic peak appearing on the lowest temperature side is at more than 180° C., a growth rate of the new precipitate becomes lower.

Diffusion Heat Treatment

As described above, the microstructure of the aluminum alloy clad sheet or the aluminum alloy clad structural member is made such that the average grain size, which is obtained by averaging grain sizes of the laminated aluminum alloy layers, is adjusted to 200 µm or less, and the interdiffusion region of Mg and Zn, which secures high strength, is provided. To achieve this, the aluminum alloy clad sheet or the aluminum alloy clad structural member before artificial age hardening (T6 treatment) must be subjected to diffusion heat treatment under a preferred condition.

In this regard, the structural member or the clad sheet is heated by a heat treatment furnace, and is preferably held for 1 to 24 hr at a temperature of the sheet or the member of 470 to 550° C., and is then rapidly cooled at an average cooling rate of 50° C./sec from the diffusion heat treatment temperature to room temperature. Any known rapid cooling method such as water cooling and air cooling may be used for the rapid cooling.

In the diffusion heat treatment temperature of less than 470° C., or in the holding time of less than 0.1 hr, or in the holding time of more than 24 hr, or in the average cooling rate from the diffusion heat treatment temperature to room temperature of less than 40° C./sec, the average grain size may not be sufficiently reduced to 200 µm or less, or the interdiffusion region of Mg and Zn may not be sufficiently formed. Hence, the aluminum alloy clad sheet or the aluminum alloy clad structural member of the invention may not be allowed to show the specific differential scanning calorimetry curve (the exothermic peak appearing on the lowest temperature side is at a temperature of 180° C. or lower, and a height of the exothermic peak is 15 µW/mg or more). Hence, when the aluminum alloy clad sheet or the aluminum alloy clad structural member after the diffusion heat treatment is subjected to short-time artificial age hardening of, for example, 180° C.×30 min, the BH property securing 0.2% proof stress of 400 MPa or more may not be exhibited.

In this regard, in JP-A-2015-108163, although diffusion heat treatment of 450° C.×1 hr is performed as in Example thereof, the diffusion heat treatment temperature is low, and the average cooling rate from the diffusion heat treatment temperature to room temperature is unknown. Hence, the aluminum alloy clad sheet or the aluminum alloy clad structural member does not show the specific differential scanning calorimetry curve and therefore may not have the BH property after being subjected to the short-time artificial age hardening.

It is, however, natural that interdiffusion of Mg and Zn between the aluminum alloy layers due to the diffusion heat treatment, or the average grain size after the diffusion heat treatment greatly varies depending on compositions of the aluminum alloy layers to be laminated, the number of laminated layers, and combinations of layers to be laminated.

Hence, the defined microstructure may not be formed due to lower temperature or shorter holding time even within the above-described condition range depending on the condition of the aluminum alloy layers to be laminated. Conversely, the defined microstructure may not be formed due to higher temperature or longer holding time even within the above-described condition range depending on the condition of the aluminum alloy layers to be laminated.

It is therefore necessary to determine (select) the optimum condition of temperature or time of the diffusion heat treatment depending on the compositions of the aluminum alloy layers to be laminated, the number of laminated layers, and the combinations of layers to be laminated.

Artificial Aging

The aluminum alloy clad sheet or the aluminum alloy clad structural member having the microstructure (microstructure subjected to diffusion heat treatment) as described above is preferably subjected to artificial age hardening, or the structural member is subjected to paint-bake hardening after painting such that high strength necessary for the structural members of vehicles is further provided.

In the invention, 0.2% proof stress of 400 MPa or more as strength after the artificial aging (after the paint-bake hardening) is defined as an index of high strength.

In the invention, low-temperature and long-time artificial aging of, for example, 120° C.×24 hr like the typical single Al—Zn alloy sheet (7000-series alloy sheet) is not necessary as artificial aging to achieve such high strength.

In the invention, the required high strength can be sufficiently given by high-temperature and short-time paint-bake hardening (artificial aging) of, for example, 160 to 205° C.×20 to 40 min, performed after painting of existing structural members of vehicles.

Hence, it is also a great advantage of the invention that high-temperature and long-time artificial aging can be omitted.

The interdiffusion microstructure of Mg and Zn and the average grain size of the aluminum alloy layer, which are defined for the aluminum alloy clad sheet or the structural member of the invention, are each substantially not varied by the artificial aging in such a condition range. Consequently, the thickness of the interdiffusion region of Mg and Zn and the average grain size of the aluminum alloy layer, which are defined for the aluminum alloy clad sheet or the structural member of the invention, may be measured after the diffusion heat treatment or after the artificial aging following the diffusion heat treatment.

Example

The invention is now described in detail with Example.

Aluminum alloy clad sheets shown in Tables 1 and 2 were manufactured.

Each of the aluminum alloy clad sheets was subjected to diffusion heat treatment, and a microstructure thereof was examined through measurement of average grain size (μm) that was obtained by averaging grain sizes of the laminated aluminum alloy layers, presence of the interdiffusion region of Mg and Zn, in which Mg and Zn interdiffused from the laminated aluminum alloy layers, and the exothermic peak temperature (° C.) on the lowest temperature side and the exothermic peak height (μW/mg) on the lowest temperature side in the DSC.

Furthermore, mechanical properties and BH properties after high-temperature and short-time artificial aging of such aluminum alloy clad sheets were measured and evaluated.

Table 2 shows results of those.

The aluminum alloy clad sheets were specifically manufactured as follows.

Aluminum alloy slabs having alloy compositions shown in Table 1 were melted and casted. The casted slabs were individually subjected to homogenization, hot rolling, and cold rolling as necessary by a common process to produce sheet materials that were adjusted to have the same thickness of 1 mm such that all clad ratios had one value corresponding to the number of laminated layers.

Such sheet materials were laminated to one another in various combinations shown in Table 2. The laminated sheet materials were reheated at 400° C. for 30 min, and then formed into clad hot-rolled sheets by a rolling clad method in which hot rolling was started at the reheating temperature.

Such clad hot-rolled sheets were cold-rolled while being subjected to process annealing of 400° C.×1 sec, and thus formed into clad sheets each having a clad thickness (total thickness of the layers) shown in Table 2.

When the clad sheet had a total thickness of 1 to 5 mm, each of the laminated alloy sheets roughly had a thickness in a range from 0.1 to 2.0 mm (100 to 2000 μm). The clad sheet was manufactured such that thicknesses (clad ratios) of the aluminum alloy layers were equal to one another as described before.

The clad sheet in each example was subjected to heat treatment (final annealing) in which the clad sheet was heated at an average heating rate of 4° C./min and held at an achieving temperature of 400° C., and then cooled at a cooling rate of 20° C./sec. Subsequently, the clad sheet was held at room temperature for one week (room-temperature aging). Subsequently, elongations (%) of the manufactured clad sheets were examined by a room-temperature tensile test as described later. Table 2 shows results of the examination.

Furthermore, the room-temperature-aged aluminum alloy clad sheets were subjected to diffusion heat treatment under a common condition, the condition being determined to be optimum within a specific range of compositions or combinations of the tested inventive examples, in which each clad sheet was held at 500° C. for 4 hr and then cooled to room temperature at a cooling rate of 80° C./sec. Subsequently, the aluminum alloy clad sheets were further held at room temperature for one week (room-temperature aging), and then samples were taken from the aluminum alloy clad sheets for the investigations of compositions, microstructures, and properties as below.

The column of the aluminum alloy clad sheet in Table 2 shows average content of each of Mg and Zn in the entire aluminum alloy clad sheet, total number of laminated layers of the sheets in Table 1, and thickness, and further shows types of the aluminum alloy layers (sheets) of A to G listed in Table 1 in terms of a combination of the laminated sheets in order from a top to a bottom of each laminate.

For example, for a clad sheet in which 5 to 15 odd layers are laminated in order of ABABA, ACACA, or the like, the aluminum alloy layer A in Table 1 is laminated on each of outer sides (top side and bottom side) of each clad sheet, and the aluminum alloy layer B, C, or the like in Table 1 is laminated on an inner side of the clad sheet.

Average Composition

For the sample subjected to room-temperature aging following the diffusion heat treatment, the content of each of Mg and Zn as the average composition of each aluminum alloy clad sheet listed in Table 2 was calculated in terms of a weighted arithmetic mean assuming all clad ratios of the aluminum alloy layers had one value corresponding to the number of laminated layers because the aluminum alloy layers (sheets) had the same thickness.

The content of each of Mg and Zn of the sample subjected to room-temperature aging following the diffusion heat treatment, the average grain size in the thickness center portion of each of the laminated aluminum alloy layers, the DSC characteristics, and presence of the interdiffusion region of Mg and Zn, in which Mg and Zn interdiffused from the laminated aluminum alloy layers, were measured by the following methods.

Average Grain Size

The average grain size of each of the laminated aluminum alloy layers of the sample subjected to room-temperature aging following the diffusion heat treatment was measured. Specifically, first, the concentration distribution of each of Mg and Zn was measured for a section at the thickness center portion of each of the laminated aluminum alloy layers, and grain size was measured at each of five visual fields in that section through observation by a light microscope of 100 magnifications. Average grain size in the thickness center portion of each of the aluminum alloy layers was obtained from such measurement results. Such average grain sizes in the thickness center portions of the aluminum alloy layers were averaged for all the laminated aluminum alloy layers, and the resultant value was determined as "average grain size obtained by averaging grain sizes of the laminated aluminum alloy layers" (μm) defined in claim 1. Table 2 shows results of this measurement.

DSC

DSC measurement was performed for samples subjected to room-temperature aging following the diffusion heat treatment, each sample including a direction (thickness direction) in which the alloy layers of the aluminum alloy clad sheet were laminated, and being sectioned to have a thickness (in a rolling or width direction) of 0.1 mm.

The measurement was conducted using DSC220G from Seiko Instruments Inc. as a tester under the same condition: standard substance: aluminum; specimen container: aluminum; heating condition: 15° C./min; atmosphere: argon (50 ml/min); and specimen weight: 24.5 to 26.5 mg. The resultant profile (μW) of the differential scanning calorimetry was divided by the weight of the sectioned sample so as to be normalized (μW/mg). Subsequently, a region having a horizontal profile of differential scanning calorimetry in the differential scanning calorimetry profile was assumed as a reference level 0, and exothermic peaks, each of which was able to be identified as a peak having a maximum height from the reference level, were identified.

Interdiffusion Region

The interdiffusion region of Mg and Zn of each sample was determined as follows. Five specimens were taken from appropriate five portions in a width direction of the clad sheet. Concentration of each of Mg and Zn in a thickness direction in a section along the thickness direction of each specimen was measured using an electron beam microanalyzer (EPMA). Determination was made on whether the interdiffusion region of Mg and Zn, in which the concentration of each of Mg and Zn measured every 1 μm in the thickness direction was within a range from 30 to 70% of the maximum content of each of Mg and Zn in each of the aluminum alloy layers before being subjected to the diffusion heat treatment, existed between the laminated aluminum alloy layers.

As a result, all inventive examples and comparative examples except comparative examples 12 and 13 each had the interdiffusion region of Mg and Zn between the laminated aluminum alloy layers, the interdiffusion region being caused by the diffusion heat treatment.

Mechanical Properties

Each of the samples subjected to room-temperature aging following the diffusion heat treatment was used to measure 0.2% proof stress (MPa) by a tensile test. To evaluate a BH property of the sample subjected to room-temperature aging following the diffusion heat treatment, the sample was further subjected to short-time heat treatment of 185° C.×20 min simulating paint-bake hardening. 0.2% Proof stress (MPa) of the sample was also measured by a tensile test. Table 2 shows results of such measurement. The 0.2% proof stress after such short-time artificial age hardening simulating paint baking was defined to be acceptable when it was 400 MPa or more.

In the tensile test for each example, the sample was machined into a JIS No. 5 test specimen, and was subjected to a room-temperature tensile test, in which a tensile direction was parallel to a rolling direction, and total elongation (%) and 0.2% proof stress (MPa) were measured. The room-temperature tensile test was performed according to JIS 2241 (1980), in which room temperature was 20° C., gage length was 50 mm, and the tensile speed was constant, 5 mm/min, until the test specimen was broken. The clad sheet being manufactured (before the T6 treatment) was also measured in total elongation (%) in the same manner.

In each of the inventive examples in Table 2, each of the aluminum alloy layers laminated on an inner side of the aluminum alloy clad sheet contains one or both of Mg: 3 to 10 mass % and Zn: 5 to 30 mass %, and the aluminum alloy layer on the outermost layer side has a composition containing Mg in a range from 3 to 10 mass % and Zn that is limited to 2 mass % or less (including 0 mass %).

The aluminum alloy layers are laminated such that aluminum alloy layers having different contents of one of Mg and Zn are adjacently bonded, and the total number of laminated layers is 5 to 15, and the total thickness is 1 to 5 mm.

The aluminum alloy clad sheet has an average content of each of Mg and Zn in a range of Mg: 2 to 8 mass % and in a range of Zn: 3 to 20 mass %, the value of the average content being obtained by averaging the contents of each of Mg and Zn of the laminated aluminum alloy layers.

A microstructure of the aluminum alloy clad sheet after the diffusion heat treatment under the above-described specific condition has an average grain size of 200 μm or less, the average grain size being obtained by averaging grain sizes of the laminated aluminum alloy layers, and has an interdiffusion region of Mg and Zn, in which Mg and Zn interdiffuse from the laminated aluminum alloy layers.

As shown in FIG. 1 (inventive example 1), in DSC of the aluminum alloy clad sheet, an exothermic peak appearing on a lowest temperature side is at a temperature of 180° C. or lower, and a height of the exothermic peak is 15 μW/mg or more.

As a result, in each inventive example, elongation of the clad sheet being manufactured (before the T6 treatment) is 13% or more, showing good formability and ductility. The 0.2% proof stress after the short-time artificial age hardening simulating paint baking shows high strength, 400 MPa or more, showing a good BH property.

On the other hand, in each of the comparative examples in Table 2, a composition of the aluminum alloy layer laminated on an inner side than the aluminum alloy layer on the outermost layer side of the clad sheet, the average content of each of Mg and Zn of the clad sheet, or the total number of laminated layers is out of the definition of the invention.

Hence, even if the clad sheet is subjected to the diffusion heat treatment under the optimum condition, although the interdiffusion region of Mg and Zn exists between the laminated aluminum alloy layers as described above, requirements such as the average grain size, the exothermic peak temperature appearing on a lowest temperature side in DSC of the aluminum alloy clad sheet, and a height of the exothermic peak are not satisfied as shown in FIG. 2 (comparative example 9 in Table 2).

As a result, the 0.2% proof stress after the short-time artificial age hardening simulating paint baking is low, less than 400 MPa, showing a particularly bad BH property.

The alloy compositions F and G in Table 1 used in the comparative examples 9 to 11 and 14 are each excessively small in Mg content or Zn content.

In the comparative examples 12 and 13, some aluminum alloy layers are laminated on inner sides such that aluminum alloy layers having different contents of one of Mg and Zn are not adjacent to each other, and aluminum alloy layers D or A having the same content of each of Mg and Zn are adjacent to each other. In addition, the number of laminated layers is small, four. As a result, the interdiffusion region of Mg and Zn does not exist at least between the aluminum alloy layers D or A having the same content of each of Mg and Zn.

TABLE 1

| | | Composition of aluminum alloy layer to be laminated (mass %, the remainder: Al) | | | | | | | |
|---|---|---|---|---|---|---|---|---|---|
| Symbol | Alloy system | Mg | Zn | Cu | Si | Fe | Zr | Ag | Ti |
| A | Al—Mg binary | 5.0 | — | — | — | — | — | — | — |
| B | Al—Zn binary | — | 20.0 | 1.0 | — | — | 0.12 | — | — |
| C | Al—Zn binary | — | 30.0 | 1.0 | — | — | 0.12 | — | — |
| D | Al—Zn—Mg ternary | 8.0 | 20.0 | — | 0.05 | 0.1 | 0.20 | — | 0.01 |
| E | Al—Zn—Mg ternary | 5.0 | 10.0 | 3.0 | 0.05 | 0.05 | — | 0.5 | 0.01 |
| F | Al—Zn—Mg ternary | 1.4 | 6.8 | 0.2 | — | — | 0.2 | — | — |
| G | Al—Zn—Mg ternary | 5.0 | 4.0 | 0.2 | 0.1 | 0.1 | — | — | 0.01 |

A sign "—" in Table indicates that the content of the element is equal to or lower than the detection limit, or is substantially 0 mass %.

TABLE 2

| | | Aluminum alloy clad sheet | | | | | | Aluminum alloy clad sheet after diffusion heat treatment | | | |
|---|---|---|---|---|---|---|---|---|---|---|---|
| | | | | | Average composition (mass %) | | Mechanical properties Total | Aluminum alloy layer Average | DSC characteristic | | Mechanical properties 0.2% | Short-time BH property 0.2% |
| Classification | No. | Number of laminated aluminum alloy layers (layer) | Thickness (mm) | Combination of aluminum alloy layers in Table 1 (lamination order from top to bottom) | Mg content | Zn content | elongation (%) | grain size (μm) | Exothermic peak temperature on lowest temperature side (° C.) | Exothermic peak height on lowest temperature side (μW/mg) | Proof stress (MPa) | Proof stress (MPa) |
| Inventive example | 1 | 5 | 1.0 | ABABA | 3 | 8 | 17 | 192 | 174 | 16.4 | 282 | 402 |
| | 2 | 5 | 1.0 | ACACA | 3 | 12 | 20 | 184 | 172 | 35.2 | 330 | 437 |
| | 3 | 9 | 1.0 | ABABABABA | 2.78 | 8.89 | 19 | 170 | 170 | 24.6 | 321 | 445 |
| | 4 | 13 | 2.0 | ABABABABABABA | 2.69 | 9.23 | 23 | 168 | 169 | 27.8 | 345 | 465 |
| | 5 | 11 | 2.0 | ACACACACACA | 2.72 | 13.64 | 17 | 145 | 166 | 36.5 | 352 | 485 |
| | 6 | 15 | 5.0 | ACACACACACACACA | 2.67 | 14 | 18 | 142 | 165 | 34.2 | 369 | 492 |
| | 7 | 5 | 1.0 | ADADA | 6.2 | 8 | 14 | 167 | 166 | 37.3 | 380 | 478 |
| | 8 | 7 | 1.0 | AEAEAEA | 5 | 4.29 | 17 | 178 | 176 | 20.9 | 321 | 418 |
| Comparative example | 9 | 7 | 1.0 | AFAFAFA | 3.45 | 2.91 | 16 | 182 | 185 | 7.8 | 252 | 332 |
| | 10 | 7 | 1.0 | BFBFBFB | 0.8 | 14.34 | 22 | 214 | 192 | 17.2 | 266 | 341 |
| | 11 | 7 | 1.0 | CFCFCFC | 0.8 | 20.06 | 14 | 187 | 199 | 14.5 | 302 | 379 |
| | 12 | 4 | 1.0 | ABBA | 2.5 | 10 | 19 | 178 | 178 | 12.2 | 265 | 354 |
| | 13 | 4 | 1.0 | ACCA | 2.5 | 15 | 18 | 198 | 172 | 13.8 | 315 | 382 |
| | 14 | 5 | 1.0 | AGAGA | 5 | 1.6 | 21 | 192 | 188 | 10.8 | 228 | 296 |

The Example supports the meaning of the requirements of the invention to achieve the aluminum alloy clad sheet having high strength, good formability, and a good BH property, or the aluminum alloy clad structural member having high strength, high ductility, and a good BH property.

According to the invention, it is possible to provide an aluminum alloy clad sheet that resolves the contradiction between a high strength level and ductility in a single sheet of the existing 7000-series aluminum alloy or the like, and has high strength, good formability (high ductility), and a good BH property through short-time artificial age hardening, and provide a structural member for a transport machine, the structural member being produced by forming the clad sheet.

What is claimed is:

1. An aluminum alloy clad sheet comprising a plurality of aluminum alloy layers,
    wherein each of the aluminum alloy layers inner than an aluminum alloy layer on an outermost layer side of the aluminum alloy clad sheet comprises one or both of Mg: 3 to 10 mass % and Zn: 5 to 30 mass %,
    wherein the aluminum alloy layer on the outermost layer side has a composition comprising Mg in a range from 3 to 10 mass % and Zn that is limited to 2 mass % or less (including 0 mass %),
    wherein the aluminum alloy layers are laminated such that aluminum alloy layers having different contents of one of Mg and Zn are adjacent to each other, total number of laminated layers is 5 to 15, and total thickness is 1 to 5 mm,
    wherein the aluminum alloy clad sheet has an average content of each of Mg and Zn in a range of Mg: 2 to 8 mass % and in a range of Zn: 3 to 20 mass %, the average content corresponding to a value obtained by averaging contents of each of Mg and Zn of the laminated aluminum alloy layers,
    wherein a microstructure of the aluminum alloy clad sheet has an average grain size of 200 μm or less, the average grain size being obtained by averaging grain sizes of the laminated aluminum alloy layers, and has an interdiffusion region of Mg and Zn, the interdiffusion region containing Mg and Zn interdiffusing from the laminated aluminum alloy layers, and
    wherein in a differential scanning calorimetry curve of the aluminum alloy clad sheet, an exothermic peak appearing on a lowest temperature side is at a temperature of 180° C. or lower, and a height of the exothermic peak is 15 μW/mg or more.

2. An aluminum alloy clad structural member comprising a plurality of aluminum alloy layers,
    wherein each of the aluminum alloy layers inner than an aluminum alloy layer on an outermost layer side of the aluminum alloy clad structural member comprises one or both of Mg: 3 to 10 mass % and Zn: 5 to 30 mass %,
    wherein the aluminum alloy layer on the outermost layer side has a composition comprising Mg in a range from 3 to 10 mass % and Zn that is limited to 2 mass % or less (including 0 mass %),
    wherein the aluminum alloy layers are laminated such that aluminum alloy layers having different contents of one of Mg and Zn are adjacent to each other, total number of laminated layers is 5 to 15, and total thickness is 1 to 5 mm,
    wherein the aluminum alloy clad structural member has an average content of each of Mg and Zn in a range of Mg: 2 to 8 mass % and in a range of Zn: 3 to 20 mass %, the average content corresponding to a value obtained by averaging contents of each of Mg and Zn of the laminated aluminum alloy layers,
    wherein a microstructure of the aluminum alloy clad structural member has an average grain size of 200 μm or less, the average grain size being obtained by averaging grain sizes of the laminated aluminum alloy layers, and has an interdiffusion region of Mg and Zn, the interdiffusion region containing Mg and Zn interdiffusing from the laminated aluminum alloy layers, and
    wherein in a differential scanning calorimetry curve of the aluminum alloy clad structural member, an exothermic peak appearing on a lowest temperature side is at a temperature of 180° C. or lower, and a height of the exothermic peak is 15 μW/mg or more.

3. The aluminum alloy clad sheet of claim 1, wherein the aluminum alloy clad sheet has an average content of each of Mg and Zn in a range of Mg: 3 to 6.2 mass % and in a range of Zn: 4.29 to 13.64 mass %.

* * * * *